Jan. 17, 1950  A. W. ASPIN  2,494,683
VEHICLE SPRING SUSPENSION
Filed Dec. 6, 1945  3 Sheets-Sheet 3
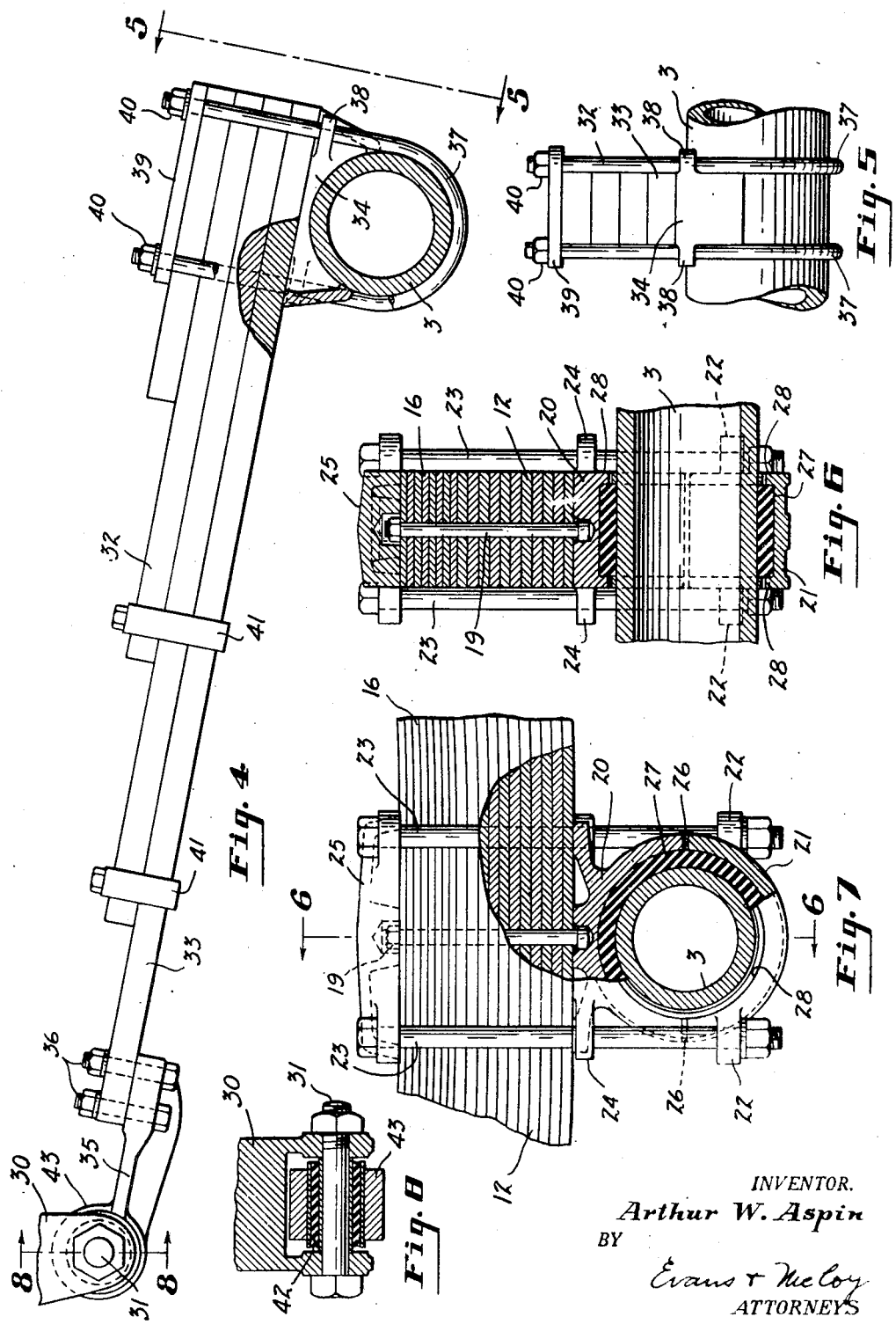
INVENTOR.
Arthur W. Aspin
BY
Evans & McCoy
ATTORNEYS Patented Jan. 17, 1950

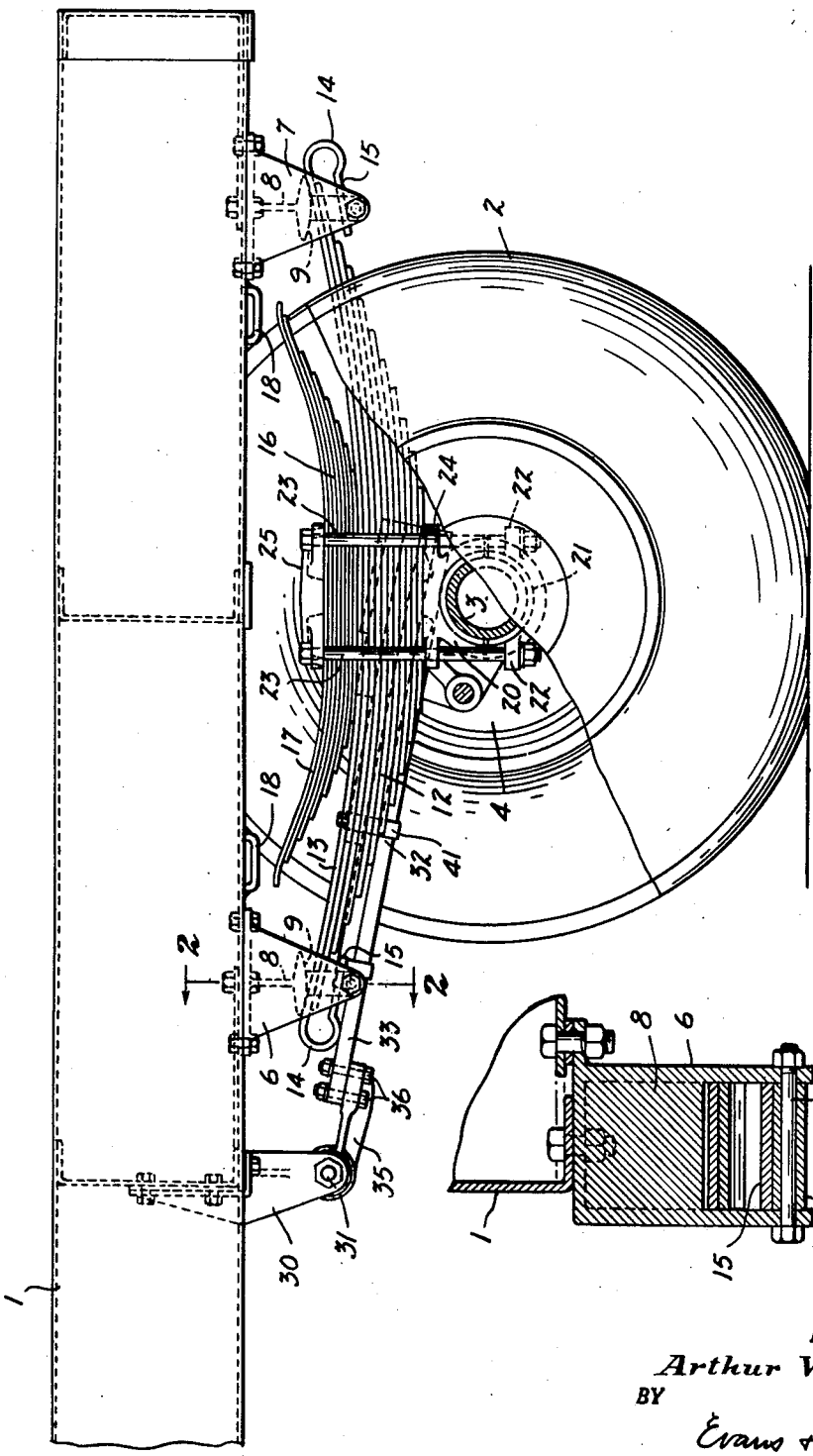

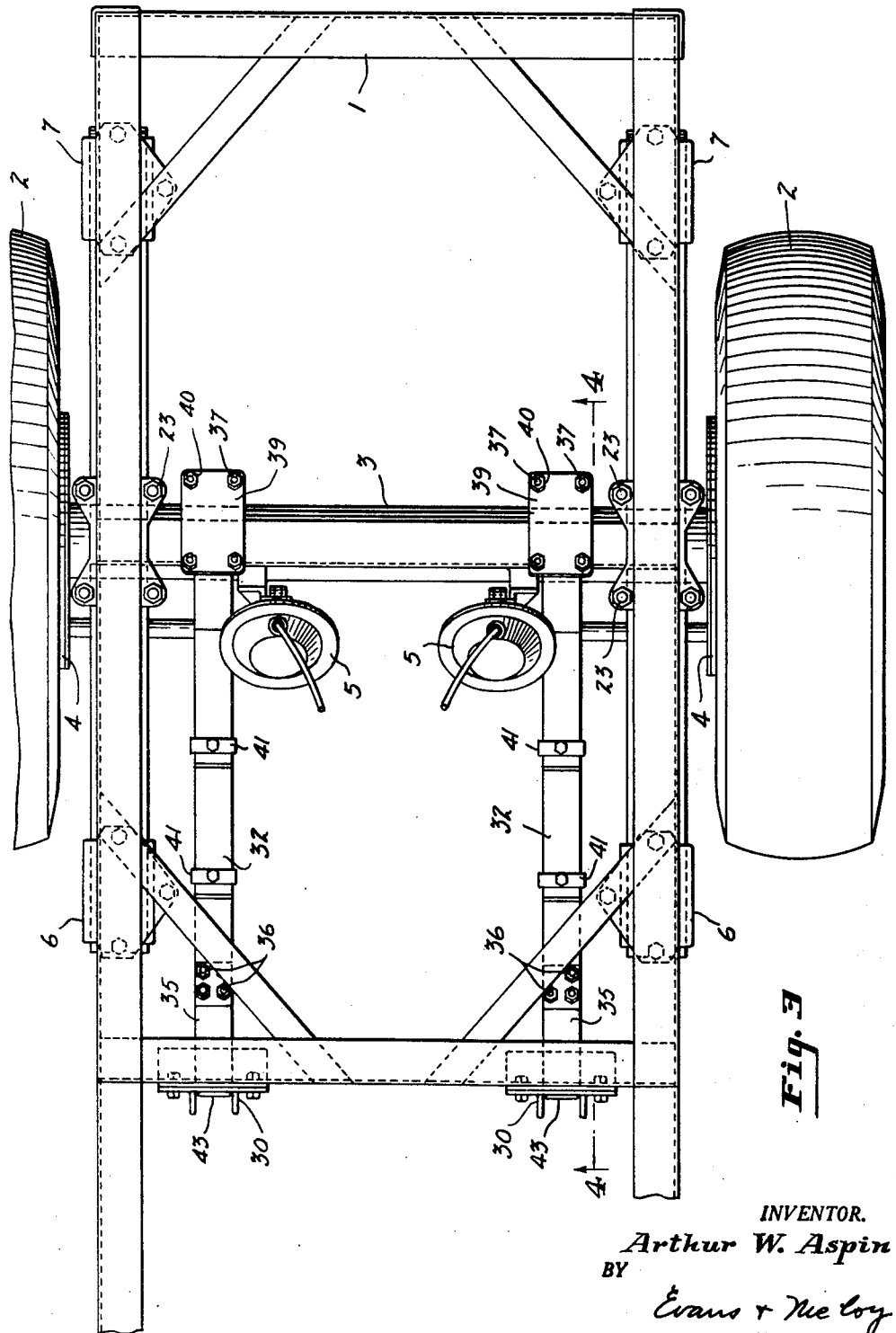

2,494,683

UNITED STATES PATENT OFFICE 2,494,683

VEHICLE SPRING SUSPENSION

Arthur W. Aspin, Butler, Pa., assignor to American Bantam Car Company, Butler, Pa., a corporation of Pennsylvania Application December 6, 1945, Serial No. 633,131

3 Claims. (Cl. 280—124)

This invention relates to a spring suspension for connecting a vehicle body to supporting wheels, and particularly to a spring suspension for trailers.

It is the object of the present invention to provide a spring suspension that eliminates side sway of the vehicle body, prevents harmonic vibrations in the springs and provides an adequately cushioned, easy riding vehicle.

A more specific object is to provide a stabilized spring suspension in which the loads are at all times uniformly applied to the supporting springs.

A further object of the invention is to provide means for transmitting braking torque uniformly to the suspension points of the load carrying springs.

With the above and other objects in view, the invention may be said to comprise the spring suspension as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of the rear portion of a trailer to which the invention is applied;

Fig. 2 is a section taken on the line indicated at 2—2 in Fig. 1;

Fig. 3 is a top plan view of the portion of the trailer shown in Fig. 1;

Fig. 4 is a section taken on the line indicated at 4—4 in Fig. 3;

Fig. 5 is an end elevation of one of the stabilizer bars viewed as indicated by the arrows 5—5 in Fig. 4;

Fig. 6 is a fragmentary transverse vertical section taken on the line indicated at 6—6 in Fig. 7, Fig. 7 is a broken sectional elevation showing the attachment of one of the axle bearings to the springs, and Fig. 8 is a section through one of the stabilizer pivots taken on the line indicated 8—8 in Fig. 4.

Referring to the accompanying drawings, a trailer body 1 is supported adjacent its rear end by wheels 2 that are rotatable on an axle 3 and that are provided with brakes 4 that are attached to the axle 3 and operated by suitable means such as air cylinders 5.

The body 1 is provided with longitudinally spaced front and rear spring engaging brackets 6 and 7 positioned on opposite sides of the body, the brackets 6 and 7 being attached to the under side of the body and projecting downwardly therefrom. The brackets 6 and 7 are of channel form with the bases of the channels attached to the bottom of the trailer body 1 and each of the brackets has a bearing member 8 attached to its base and provided with a curved bottom face 9. At their lower ends and spaced below the bearing members 8, the brackets carry transverse pins 10 each of which has a bearing member in the form of a sleeve 11 rotatably mounted thereon. The surfaces 9 and the sleeves 11 provide bearings for the opposite ends of a semi-elliptic spring 12 that has a top leaf 13 projecting beyond the other leaves thereof and extending through the spaces between the bearing members 8 and 11. The ends of the leaf 13 are bent to provide enlarged loops 14 at the ends and inwardly extending end portions 15 that rest upon the sleeves 11. The ends of the spring 12 are slidable in the brackets 6 and 7, the top surfaces of the leaf 13 bearing against the curved surfaces 9 and the reversely bent ends 15 thereof bearing against the sleeves 11.

A bumper spring 16 is mounted upon the top of each of the supporting springs 12, the spring 16 being also a semi-elliptic spring with its ends curved upwardly and with its uppermost leaf 17 longer than the other leaves of the springs, the ends of the spring 16 being engageable with bumper plates 18 attached to the bottom of the trailer body 1.

The springs 12 are supported centrally upon transversely alined axle bearings 20, each of which has a detachable bottom section 21 to facilitate its assembly upon the axle. The detachable bottom section 21 has laterally projecting flanges 22 to receive clamping bolts 23 which extend vertically through flanges 24 integral with the upper portion of the bearing and through a clamping plate 25 that rests upon the top of the bumper spring 16. Shims 26 may be placed between the detachable section 21 of the bearing and the body 20 thereof and a rubber sleeve 27 is mounted within the sectional bearing. The sleeve 27 fits upon the axle 3 and is retained within the bearing 20 by means of inwardly projecting flanges 28 on the bearing member. The rubber sleeve 27 provides a yielding connection between the spring and axle which will permit angular movements of the axle with the bearings. The weight of the body 1 is normally imposed upon the springs 12 and the bumper springs 16 are normally supported out of contact with the bumper plates 18 so that the springs 16 come into action only after initial deflection of the springs 12.

Forwardly and inwardly of the bracket 6, brackets 30 are attached to the under side of the body 1 and these brackets carry horizontal pivots 31. The axle is yieldingly held against turning movements and also against tilting movements with respect to the body 1 by means of a pair of stabilizer bars 32 each of which is in the form of a leaf spring. Each stabilizer bar is composed of a lower leaf 33 and a series of progressively shorter leaves superimposed upon the leaf 33. The leaf 33 rests at its rear end upon a saddle member 34 that is mounted on the axle 3 and its forward end is rigidly connected to an arm 35 by means of bolts 36, the arm 35 being mounted to swing on the pivot 31.

The leaves of the stabilizer bar 32 have their rear ends positioned over the axle 3 and are clamped to the axle by means of U bolts 37 that extend around the under side of the axle 3 and have arms extending upwardly through flanges 38 carried by the saddle member 34 and through a clamping plate 39 that is positioned upon the uppermost leaf of the spring stabilizer bar, the upper ends of the U bolt arms having nuts 40 thereon that serve to rigidly clamp the axle to the saddle member 34 at the rear end of the stabilizer bar, so as to hold the axle against turning movements in the saddle member.

Clips 41 may be provided to secure the upper leaves 32 of the spring stabilizer bar to the bottom leaf 33 thereof, and the stabilizer arm pivots are preferably cushioned by means of rubber bushings 42 fitting in eyes 43 at the forward ends of the stabilizer bars and surrounding the pivot pins 31.

Since the axle is free to turn in the bearing members 20 to which the supporting springs are attached, torque stresses applied to the axle through the wheel brakes are not directly transmitted to the supporting springs. The spring stabilizer bars 32 serve as torque cushioning springs to help absorb the torsional stresses, as radius rods to prevent shifting of the axle longitudinally of the trailer body, and as stabilizers to retain the axle in a position substantially parallel with the plane of the bottom of the trailer body.

Thrusts applied to the axle through the wheels which tend to rock the axle with respect to the plane of the bottom of the trailer body are cushioned by the spring stabilizer arms 32 which permit only a slight relative tilting movement of the axle with respect to the body. Since torsional stresses and axle tilting stresses are taken by the spring stabilizer arms, the load is applied substantially uniformly to the ends of the supporting springs, and the torsional and tilting stresses are transmitted through the stabilizer bars to the trailer body 1 exerting a downward thrust thereon which is applied equally to the ends of the supporting springs. By reason of the torque cushioning and stabilizing springs the load is applied at all times in a vertical direction to the center of the supporting springs and the supporting springs may be of a length such that a very easy riding trailer body is provided. The bumper springs 16 serve to break up any harmonic vibrations in a vertical direction and the stabilizer and torque cushioning bars serve to limit angular oscillations of the trailer body.

It is to be understood that variations and modifications of the specific devices herein shown and described for purposes of illustration, may be made without departing from the spirit of the invention.

What I claim is:
1. A vehicle of the character described comprising a body, longitudinally spaced brackets attached to said body adjacent each side thereof, spring means including a leaf spring having its ends movably connected to the brackets at each side of the body and a bumper leaf spring resting on the top leaf of said first spring and normally out of engagement with said body, transversely alined bearing means attached to and clamping together the springs intermediate their ends, an axle rotatably mounted in said bearings, wheels rotatably mounted on the axle, brakes for the wheels attached to the axle, and torque cushioning stabilizer bars inwardly of said springs on each side of said body, each pivoted at one end to the body and rigidly attached at the other end to said axle, said bars being resilient and serving as torque cushioning springs, radius rods and stabilizers for said body.

2. A vehicle of the character described comprising a body, longitudinally spaced brackets attached to said body adjacent each side thereof, a semi-elliptic leaf spring having end portions slidably mounted in the brackets at each side of said body, transversely alined bearing members rigidly clamped to the under sides of said springs intermediate the ends of the springs, an axle rotatably mounted in said bearings, wheels rotatable on said axle, brakes for said wheels attached to said axle, and torque cushioning stabilizer bars on each side of said body, each comprising a leaf spring rigidly attached at one end to said axle and pivotally connected to said body forwardly of said axle.

3. A vehicle of the character described comprising a body, longitudinally spaced brackets attached to said body adjacent each side thereof, a semi-elliptic leaf spring having end portions slidably mounted in the brackets at each side of said body, a second shorter leaf spring mounted centrally upon the top of each of the first mentioned springs, the latter springs having upwardly extending end portions normally spaced from the under side of said body, transversely alined bearings beneath the first mentioned springs, means for clamping the superposed springs together and to said bearings, an axle rotatably mounted in said bearings, wheels rotatable on said axle, brakes for said wheels attached to said axle, and torque cushioning stabilizer bars, each comprising a leaf spring rigidly attached at one end to said axle and pivotally connected at its opposite end to said body forwardly of said axle.

ARTHUR W. ASPIN.

REFERENCES CITED

The following references are of record in the file of this patent:

UNITED STATES PATENTS

| Number | Name | Date |
|---|---|---|
| 751,529 | Maxwell | Feb. 9, 1904 |
| 926,176 | Daimler | June 29, 1909 |
| 1,544,708 | Wells | July 7, 1925 |
| 1,833,405 | Bock et al. | Nov. 24, 1931 |
| 1,939,155 | Wise | Dec. 12, 1933 |
| 2,041,660 | Le Moon | May 19, 1936 |
| 2,067,861 | Robin | Jan. 12, 1937 |
| 2,176,978 | Northrup et al. | Oct. 24, 1939 |
| 2,204,087 | Konetsky | June 11, 1940 |
| 2,312,253 | Konetsky | Feb. 23, 1943 |
| 2,387,874 | Bradley | Oct. 30, 1945 |